United States Patent Office 3,644,399
Patented Feb. 22, 1972

3,644,399
PYRROLE LOWER ALKANOIC ACIDS AND DERIVATIVES
Kevan Brown, Reading, and John Frederick Cavalla, Iseworth, Middlesex, England, assignors to John Wyeth & Brothers Limited, Taplow, England
No Drawing. Filed May 1, 1969, Ser. No. 821,075
Claims priority, application Great Britain, May 7, 1968, 21,615/68
Int. Cl. C07d 27/26
U.S. Cl. 260—326.3                    7 Claims

ABSTRACT OF THE DISCLOSURE

The invention concerns diaryl furan, thiophene, and pyrrole lower alkanoic acids and derivatives which are pharmacologically efficacious as anti-inflammatory agents.

---

This invention relates to novel heterocyclic aromatic compounds, to processes for the preparation thereof and to pharmaceutical compositions containing such compounds. The heterocyclic aromatic compounds concerned in this invention are furans, thiophenes and pyrroles substituted by two aryl groups and an aliphatic acid group containing from two to six carbon atoms or a derivative thereof.

The present invention provides compounds of the general formula

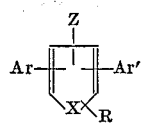

(I)

in which X is oxygen, sulphur or —NY—, Ar and $Ar^1$ are aryl radicals (which includes in the description below heteroaryl radicals) and which may be the same or different; R is an aliphatic acid radical containing from two to six carbon atoms or a derivative thereof, Y is a hydrogen atom or an alkyl, cycloalkyl, aralkyl, aryl or heteroaryl radical which may for example be substituted particularly by halogen, nitro, trifluoromethyl or alkoxy groups or an acyl radical, and Z is a hydrogen atom or an alkyl radical. It is to be understood that one of the radicals Ar, $Ar^1$ and R is in the 2-position and the remaining two of these three radicals are in other positions round the ring excluding the 1-position (i.e. excluding the hetero atom position). Thus, the aryl groups can be in the 2- and 4- positions, the 2- and 3-positions, the 3- and 4- positions, the 3- and 5- positions or the 2- and 5- positions, the radical R being substituted on one of the remaining carbon atoms, and Z being substituted on the last remaining carbon atom.

The compounds of the above general formula exhibit pharmacological activity for example anti-inflammatory activity as shown by tests on warm-blooded animals and/or are intermediates in the preparation of other substituted furans, thiophenes and pyrroles.

Examples of radicals Ar and $Ar^1$ are unsubstituted phenyl, or phenyl substituted by halogen (for example by fluorine, chlorine or bromine), by lower alkyl (e.g. methyl, ethyl, propyl or butyl), by lower alkoxy (e.g. by methoxy, ethoxy, propoxy or butoxy), by nitro, by amino (including alkyl substituted amino groups) in particular by dialkylamino (e.g. dimethylamino), by trifluoromethyl, by mercapto, by methylthio or by methylsulphonyl, as well as 1- and 2- naphthyl, 2- and 3- furyl, 2- and 3- thienyl and 2-, 3- and 4-pyridyl. The radical R preferably is an aliphatic acid radical containing from two to six carbon atoms more preferably from 2 to 4 carbon atoms, or is a suitable derivative thereof, e.g. an ester, amide, salt or hydroxamic acid derivative thereof. Preferred examples of radicals R are acetic, n-propionic, iso-propionic, and butyric acid radicals as well as unsaturated acid radicals, such as acrylic acid. If the acid is in the form of an ester it is preferably the alkyl ester such as ethyl ester. The alkyl or alkoxy groups preferably contain 1 to 4 carbon atoms.

Examples of Z are a hydrogen atom, lower alkyl radicals having up to six carbon atoms, particularly methyl, ethyl, propyl or butyl. Examples of Y are lower alkyl radicals as just mentioned and cycloalkyl radicals such as cyclopentyl and cyclohexyl, aralkyl radicals such as benzyl, phenethyl and 1- or 2- phenyl propyl, aryl radicals such as phenyl or 1- or 2- naphthyl and heteroaryl radicals such as 1- or 2- thienyl or furyl, 2-, 3- or 4- pyridyl, 2- or 3-indolyl and 1 or 2-pyrrolyl which may be substituted by any of the substituents mentioned above for Ar and $Ar^1$, or Y can be the acyl residue of a sulphonic oxy-acid such as an aryl sulphonic acid or alkyl sulphonic acid or of an organic carboxylic acid, particularly Y can be an alkanoyl, cycloalkanoyl, aralkanoyl, aroyl or heteroaroyl residue which can be substituted in the last three cases as aforesaid for Ar and $Ar^1$.

These compounds of general Formula I may be prepared by cyclising a precursor of the furan, thiophene or pyrrole with the simultaneous introduction of the heteroatom. That is to say, the precursor generally is a 1,4-dioxobutane appropriately substituted by the radicals Ar, $Ar^1$, Z and $R^1$ where $R^1$ is the same as R or is a radical convertible thereto. Such a precursor is a compound having the structure.

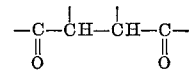

(II)

in which the radical Ar is a substituent on one of the carbon atoms, radical $Ar^1$ on another carbon atom, radical $R^1$ on a third carbon atom, and a hydrogen atom or alkyl radical is on the fourth carbon atom. The compounds of general Formula II can be prepared by reacting an enamine with a 1-halo-2-ketoethane, as is described below for the individual special isomers. $R^1$ generally is the aliphatic acid, or an alkyl ester thereof, which is desired as radical R.

In order to form a pyroole, a compound of general Formula II can be heated in the presence of ammonia, urea or a primary amine $YNH_2$ or salt thereof, preferably by heating with ammonium acetate. This is a standard type of reaction for the preparation of pyrroles and may, for example, be carried out at temperatures of 70–100° C. In this reaction the radical $R^1$ preferably is an aliphatic acid group. On the other hand, in order to prepare a furan or thiophene from the compound of general Formula II, $R^1$ preferably is an ester of an aliphatic acid (e.g. the ethyl acetate), in which case the said compound either can be heated with a dehydrating and cyclising agent (preferably an acidic dehydrating agent such as sulphuric acid or a sulphonic acid or phosphorus pentoxide) to give the furan or can be heated with a sulphur-donating dehydrating and cyclising agent (preferably phosphorus pentasulphide or a mixture of hydrogen sulphide and a strong acid such as a hydrohalic acid) to give the thiophene. The ester group in the ensuing compound can be hydrolysed in standard manner to give the more preferred acid. An inert organic solvent, e.g. benzene or chloroform may be present when preparing the furan or thiophene.

The process for preparing the compounds of the invention is illustrated in more detail below, in which Ar, $Ar^1$, and $R^1$ have the meanings defined above, Hal is a halogen atom and HNAB is an amine (e.g. morpholine) used to form the enamine.

(1) The reaction of an enamine of Formula III(a) with a haloketone of Formula III(b) yields a 1,3-diaryl-1,4-dicarbonyl compound of Formula III(c) which is cyclised as described above to the 3,5-diaryl-2-R¹ product of Formula III(d).

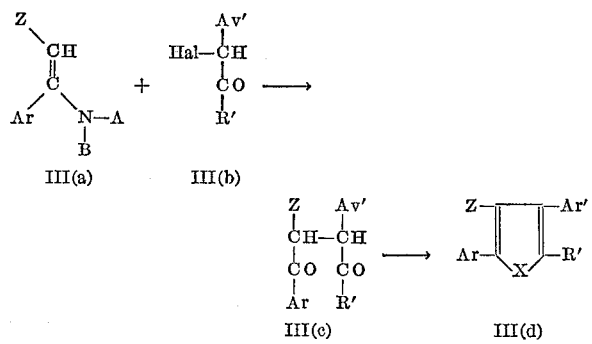

(2) In a similar manner, the reaction of an enamine of Formula IV(a) with a haloketone of Formula IV(b) yields a 1,4-diaryl-1,4-dicarbonyl compound of Formula IV(c) which is cyclised as described above to the 2,5-diaryl-3-R¹ product of Formula IV(d).

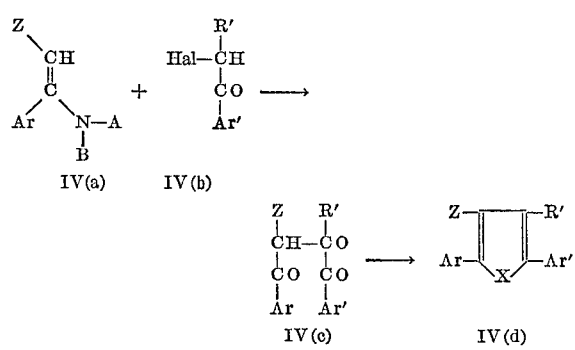

The 1,4-diaryl-1,4-dicarbonyl compounds of Formula IV(c) wherein Ar and Ar¹ are the same and R¹ represents the diethyl malonate residue (i.e.

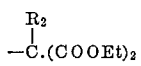

where $R^2$ is a hydrogen atom or a lower alkyl residue) can be prepared by Michael addition of the appropriate malonate to a dibenzoyl ethylene of Formula IV(e). This may be cyclised to IV(d) wherein $R^1$ represents the diethyl malonate residue defined above, or hydrolysed and decarboxylated to give compounds of Formula IV(c) wherein $R^1$ now represents an acetic or substituted acetic acid residue and then cyclised to compounds of Formula IV(d) wherein $R^1$ is an acetic or substituted acetic acid residue.

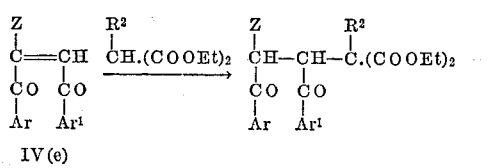

The 1,4-diaryl-1,4-dicarbonyl compounds of Formula IV(c) wherein Ar and Ar¹ are the same or different and R¹ is an alkoxycarbonyl residue can be prepared by alkylating a benzoylacetate of Formula IV(f) with a phenacylbromide of Formula IV(g) in the presence of metallic sodium.

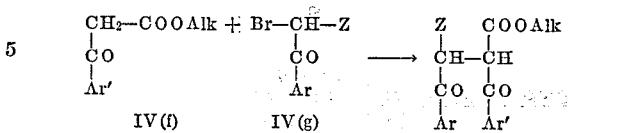

(3) The reaction of an enamine of Formula V(a) with a haloketone of Formula V(b) yields a 1,2-diaryl-1,4-dicarbonyl compound of Formula V(c) which is cyclised as described above to the 2,3-diaryl-5-R¹ product of Formula V(d).

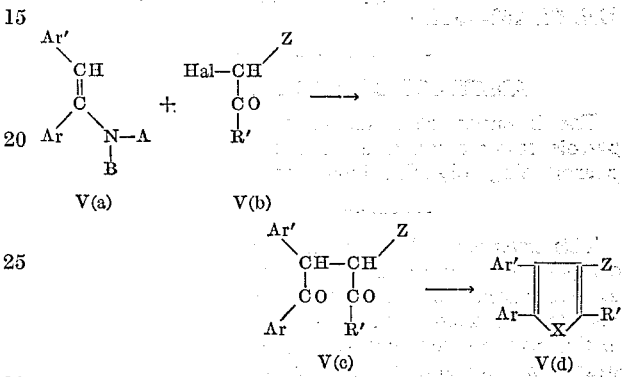

(4) The reaction of an enamine of Formula VI(a) with a haloketone of Formula VI(b) yields a 2,3-diaryl-1,4-dicarbonyl compound of Formula VI(c) which is cyclised as described above to the 3,4-diaryl-2-R¹ product of Formula VI(d).

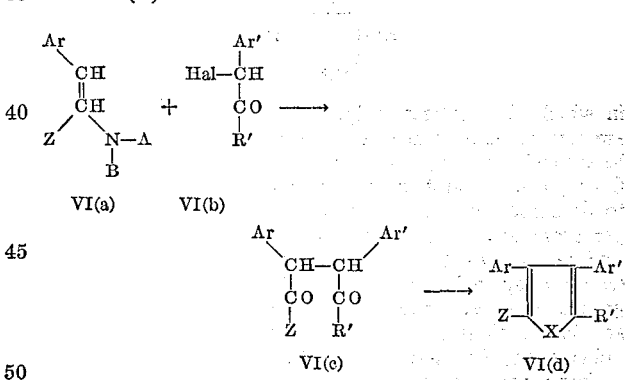

(5) Furthermore, the reaction of an enamine of Formula VII(a) with a halo-carbonyl compound of Formula VII(b) yields a 1,2-diaryl-1,4-dicarbonyl compound of Formula VII(c) which is cyclised as described above to the 2,3-diaryl-4-R¹ product of Formula VII(d)

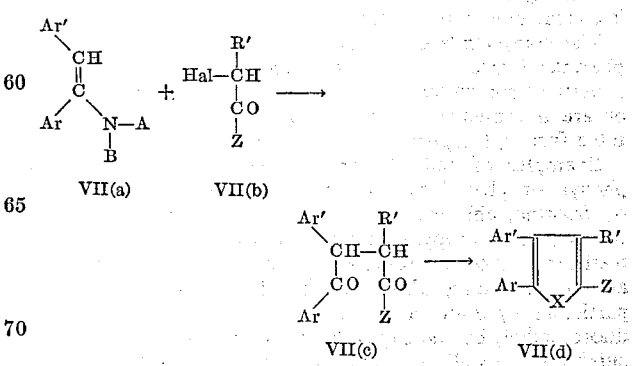

(6) The reaction of an enamine of Formula VIII(a) with a haloketone of Formula VIII(b) yields a 1,3-diaryl-1,4-dicarbonyl compound of Formula VIII(c) which is cyclised as described above to the 2,4-diaryl-3-R¹ product of Formula VIII(d).

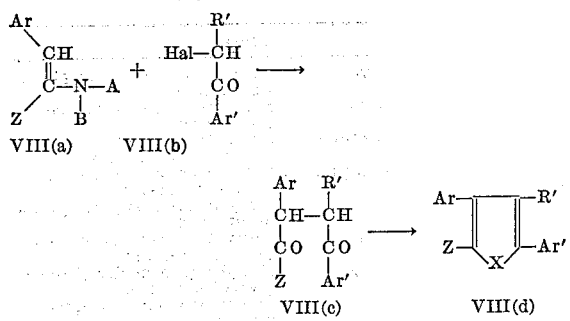

The above reactions usually are carried out in solution in an inert organic solvent, by heating the reaction mixture. Solvents and reaction conditions known in the art for the preparation of furans, thiophenes and pyrroles can be used. The starting materials for the above processes are known and are commercially available, or can be prepared following methods known in the art for the preparation of compounds of that type.

Other generally less-preferred methods of preparation of compounds of general Formula (I) can also be used. For example a compound of the general formula:

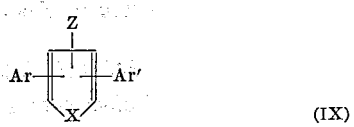

(IX)

can be prepared following one of the above methods (but with R¹ replaced by hydrogen) and then the radical R¹ can be introduced. Thus, a compound of general Formula (I) can be prepared from a compound of general Formula IX using a Reimer-Tiemann reaction, by treating the compound of general Formula (IX) with chloroform in a caustic alkali (e.g. potassium hydroxide) followed by acidification to give a compound substituted by a formyl group. The formyl group can be converted to a group of general Formula R in a known manner, e.g. by reduction to a hydroxymethyl group followed by halogenation and reaction with a cyanide (e.g. potassium cyanide) to give a nitrile which may then be hydrolysed to the amide or acid. Alternatively, the formyl group can be condensed with a malonic ester and if necessary subsequent reduction carried out. Alternatively again, a compound of general Formula (IX) preferably when X is an S or O atom can be reacted at temperatures below ambient temperature with hydrogen cyanide in an inert solvent which is saturated or nearly saturated with a hydrogen halide; the aldehyde formed can then be converted to the acid in known manner. A further method involves oxidising the said aldehyde to the corresponding carboxyl radical by treatment with an alkali metal or alkaline earth metal hydroxide followed by an Arndt-Eistert reaction. Of course, any equivalent method of introducing an aliphatic acid group containing two to six carbon atoms into a furan, thiophene or pyrrole ring can be used.

As indicated above, if a compound is produced according to the invention in which the radical R¹ is a nitrile, this may be hydrolysed to the amide or acid. Alternatively, the acid may be esterified to give the ester, or the ester may be reacted with hydroxylamine to give the hydroxamic acid derivative. Generally the acid is required so that, if the ester is prepared, this may be hydrolysed.

If R¹ represents a diethyl malonate residue of formula

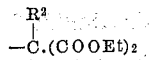

(wherein R² is a hydrogen atom or lower alkyl residue) this may be hydrolysed to the dicarboxylic acid which in turn can be decarboxylated to the acetic or substituted acetic acid.

Pyrrole compounds in which X is —NY— where Y is an alkyl, cycloalkyl, aralkyl, aryl or heteroaryl radical (any of which can be substituted), or an acyl residue, can be prepared from those in which X is —NH— by alkylation or acylation to introduce the desired group Y. If desired any other sensitive group in the molecule can be protected and the protecting group removed after the alkylation or acylation process. It is convenient to prepare N-alkyl, cycloalkyl, aralkyl, aryl or heteroaryl derivatives of the acidic molecules by first protecting the carboxyl group, for instance using an ethyl ester, carrying out the alkylation reaction and finally removing the protecting group. When preparing N-acyl derivatives of the acidic molecules, the carboxyl group is preferably protected by forming the t-butyl ester or benzyl ester these groups being finally removed by heating or catalytic hydrogenation respectively.

As the compounds of general Formula (I) show pharmaceutical activity, for example, anti-inflammatory activity, the invention provides a pharmaceutical composition comprising a compound of general Formula (I), and a pharmaceutically acceptable carrier.

When the compounds of this invention are employed as anti-inflammatory agents they can be administered to warm-blooded animals, e.g. mice, rats, rabbits, dogs, cats, monkeys, etc. alone or as a pharmaceutical composition in combination with pharmaceutically acceptable carriers. The carrier may be solid, liquid or cream-like and any suitable carrier known to the art can be used. The composition can be in unit dose form, for example as tablets or capsules or it can be in the form of a solution. The compositions can be administered orally or parenterally by injection and the composition can, for parenteral administration, be in the form of a sterile solution or suspension containing other solutes, for example enough saline or glucose to render the solution isotonic. The particular carrier and proportion of carrier to active compound will be determined by the nature of the compound, and the chosen route of administration and standard pharmaceutical practice.

The dosage of the active compound will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples illustrate the invention:

EXAMPLE 1

2,5-diphenylpyrrole-3-acetic acid (a) 3,4-dibenzoylbutyric acid (200 mg.) is heated with ammonium acetate (1.0 g.) at 80–100° C. Initially, the mixture gives a clear melt but after 3 minutes, solidification occurs and heating is stopped. On cooling, water is added and the resulting solid is filtered off and recrystallised from aqueous acetic acid to give 2,5-diphenylpyrrole-3-acetic acid as needle crystals of M.P. 123–125° C.

Found: C, 78.3; H, 5.4; N, 4.9. $C_{18}H_{15}NO_2$ requires C, 78.0; H, 5.5; N, 5.1%.

(b) The 3,4-dibenzoylbutyric acid is prepared as follows: 1-(4′-morpholino)styrene (5.0 g.) and 3-benzoyl-3-bromopropionic acid (5.0 g.) are heated together in refluxing dioxane (50 ml.) for 2 hours. The mixture is cooled and poured into water, which is then acidified with concentrated hydrochloric acid (0.5 ml.). After 16 hours at room temperature, the mixture is extracted with ether. The ether solution is washed with 2 N hydrochloric acid solution, then with water and finally is extracted with 2 N sodium hydroxide solution. The basic solution is washed once with ether and then acidified with concentrated hydrochloric acid solution. The crystalline solid formed is filtered off and separated by chromatography to give a product M.P. 138° C. and the desired acid M.P. 148°–150° C.

In a similar manner the following starting materials give the products indicated:

| Starting material | Product |
| --- | --- |
| 3,4-di-(p-chlorobenzoyl)butyric acid. | 2,5-di-(p-chlorophenyl)pyrrole-3-acetic acid. |
| 3,4-di-(p-fluorobenzoyl)butyric acid. | 2,5-di-(p-fluorophenyl)pyrrole-3-acetic acid. |
| 3,4-di-(m-trifluoromethylbenzoyl)butyric acid. | 2,5-di-(m-trifluoromethylphenyl)pyrrole-3-acetic acid. |
| 3,4-di-(p-methoxybenzoyl)butyric acid. | 2,5-di-(p-methoxyphenyl)pyrrole-3-acetic acid. |
| 3,4-di-(p-methylbenzoly)butyric acid. | 2,5-di-(p-methylphenyl)pyrrole-3-acetic acid. |
| 3-benzoyl-4-(p-chlorobenzoyl)butyric acid. | 2-phenyl-5-(p-chlorophenyl)pyrrole-3-acetic acid. |
| 4-benzoyl-3-(p-chlorobenzoyl)butyric acid. | 5-phenyl-2-(p-chlorophenyl)pyrrole-3-acetic acid. |
| 4,5-dibenzoylvaleric acid. | β-(2,5-diphenylpyrrol-3-yl)propionic acid. |
| 3,4-di-(p-dimethylaminobenzoyl)butyric acid. | 2,5-di-(p-dimethylaminophenyl)pyrrole-3-acetic acid. |
| 3-benzoyl-4-(p-nitrobenzoyl)butyric acid. | 5-(p-nitrophenyl)-2-phenylpyrrole-3-acetic acid. |
| 3-benzoyl-4-(naptho-1-yl)butyric acid. | 5-(naphth-1-yl)-2-phenylpyrrole-3-acetic acid. |
| 3-benzoyl-4-(naphtho-2-yl)-butyric acid. | 5-(naphth-2-yl)-2-phenylpyrrole-3-acetic acid. |
| 3-benzoyl-4-(furo-3-yl)butyric acid. | 5-(fur-3-yl)-2-phenylpyrrole-3-acetic acid. |
| 3-benzoyl-4-(theno-3-yl)butyric acid. | 2-phenyl-5-(thien-3-yl)pyrrole-3-acetic acid. |
| 3-benzoyl-4-(pyrid-2-ylcarbonyl)butyric acid. | 2-phenyl-5-(pyrid-2-yl)pyrrole-3-acetic acid. |
| 3-benzoyl-4-(pyrid-3-ylcarbonyl)butyric acid. | 2-phenyl-5-(pyrid-3-yl)-pyrrole-3-acetic acid. |
| 3-benzoyl-4-(pyrid-4-ylcarbonyl)butyric acid. | 2-phenyl-5-(pyrid-4-yl)-pyrrole-3-acetic acid. |
| 3 4-di-(furo-2-yl)butyric acid. | 2 5-di-(fur-2-yl)pyrrole-3-acetic acid. |
| 3 4-di-(theno-2-yl)butyric acid. | 2 5-di-(thien-2-yl)pyrrole-3-acetic acid. |

EXAMPLE 2

2,5-diphenylfuran-3-acetic acid (a) 3,4-dibenzoylbutyric acid is converted into its methyl ester by treatment with diazomethane in ether. Subsequent reaction with phosphorus pentoxide in benzene solution gives the methyl ester of the title acid.

(b) Hydrolysis of the ester of part (a) with sodium hydroxide gives the title acid for M.P. 134–135° C.

In a similar manner the following starting materials give the products indicated:

| Starting material | Product |
| --- | --- |
| 3,4-di-(p-chlorobenzoyl)butyric acid. | 2,5-di(p-chlorophenyl)furan-3-acetic acid. |
| 3,4-di-(p-fluorobenzoyl)butyric alid. | 2,5-di-(p-fluorophenyl)furan-3-acetic acid. |
| 3,4-di-(m-trifluoromethylbenzoyl)butyric acid. | 2,5-di-(m-trifluoromethylphenyl)-furan-3-acetic acid. |
| 3,4-di-(p-methoxybenzoyl)butyric acid. | 2,5-di(p-methoxyphenyl)furan-3-acetic acid. |
| 3,4-di-(p-methylbenzoyl)butyric acid. | 2,5-di(p-methylphenyl)furan-3-acetic acid. |
| 3-benzoyl-4-(p-chlorobenzoyl)butyric acid. | 2-phenyl-5-(p-chlorophenyl)furan-3-acetic acid. |
| 4-benzoyl-3-(p-chlorobenzoyl)butyric acid. | 5-phenyl-2-(p-chlorophenyl)furan-3-acetic acid. |
| 4,5-dibenzoylvaleric acid | β-(2·5-diphenylfur-3-yl) propionic acid. |

EXAMPLE 3

2,5-diphenylthiophene-3-acetic acid (a) 3,4-dibenzoylbutyric acid is converted into its methyl ester by treatment with diazomethane in ether. Subsequent reaction of 10.0 g. of this ester with phosphorus pentasulphide (20.0 g.) in benzene solution (50 ml.) gives the methyl ester of the title acid.

(b) Hydrolysis of the ester of part (a) with sodium hydroxide gives the title acid.

In a similar manner the following starting materials give the products indicated.

| Starting material | Product |
| --- | --- |
| 3,4-di-(p-chlorobenzoyl)butyric acid. | 2,5-di-(p-chlorophenyl)thiophene-3-acetic acid. |
| 3,4-di-(p-fluorobenzoyl)butyric acid. | 2,5-di-(p-fluorophenyl)-thiophene-3-acetic acid. |
| 3,4-di-(m-trifluoromethylbenzoyl)butyric acid. | 2,5-di-(m-trifluoromethylphenyl)-thiophene-3-acetic acid. |
| 3,4-di-(p-methoxybenzoyl)butyric acid. | 2,5-di-(p-methoxyphenyl)-thiophene-3-acetic acid. |
| 3,4-di-(p-methylbenzoyl)butyric acid. | 2,5-di-(p-methylphenyl)thiophene-3-acetic acid. |
| 3-benzoyl-4-(p-chlorobenzoyl)-butyric acid. | 2-phenyl-5-(p-chlorophenyl)thiophene-3-acetic acid. |
| 4-benzoyl-3-(p-chlorobenzoyl)-butyric acid. | 5-phenyl-2-(p-chlorophenyl)-thiophene-3-acetic acid. |
| 4,5-dibenzoylvaleric acid. | β-(2 5-diphenylthien-3-yl)-propionic acid. |

EXAMPLE 4

Ethyl 3,5-diphenylpyrrole-2-acetate (a) The morpholino enamine of acetophenone [i.e. 1-(4'-morpholino)styrene] is treated with ethyl 4-bromo-4-phenylacetoacetate in a manner similar to that described in Example 1(b) to give ethyl 3,6-dioxo-4,6-diphenylhexanoate.

(b) The ester of part (a) was reacted with ammonium acetate by the procedure of Example 1(a) to give the title pyrrole ester.

EXAMPLE 5

Ethyl 3,5-diphenylfuran-2-acetate

Ethyl 3,6 - dioxo - 4,6 - diphenylhexanoate (1.5 g.) is heated under reflux for 2 hours with phosphorus pentoxide (1.0 g.) in benzene (50 ml.). The organic solution is then decanted and evaporated to give the title furan ester.

EXAMPLE 6

Ethyl 3,5-diphenylthiophene-2-acetate

Ethyl 3,6-dioxo-4,6-diphenylhexanoate is heated with phosphorus pentasulphide in benzene to give the title thiophene ester.

EXAMPLE 7

3,4-diphenylpyrrole-2-propionic acid (a) The pyrrolidino enamine of phenylacetaldehyde [i.e. 2-(1'-pyrrolidino)styrene] is reacted with ethyl 5-bromo-4-oxo-5-phenyl-valerate in a similar manner to that described in Example 1(b) to give ethyl 4,7-dioxo-5,6-diphenylheptoate.

(b) The ester of part (a) is hydrolysed to the corresponding acid and is then treated with ammonium acetate as described in Example 1(a) to give the title pyrrole acid.

EXAMPLE 8

3,4-diphenylfuran-2-propionic acid (a) Ethyl 4,7-dioxo-5,6-diphenylheptoate (8.0 g.) is heated under reflux for 3 hours with phosphorus pentoxide (6.0 g.) in benzene (100 ml.). The organic layer is then decanted and evaporated to give the ethyl ester of the title acid.

(b) The ester of part (a) in ethanol is warmed to 50° C. and treated with a solution of potassium hydroxide (3.0 g.) in water (10 ml.). Evaporation of the solution, dissolution of the residue in water and acidification gives the title furan acid.

EXAMPLE 9

3,4-diphenylthiophene-2-propionic acid

The method of Example 8 is repeated but using phosphorus pentasulphide instead of phosphorus pentoxide to give the title thiophene acid.

EXAMPLE 10

2,3-diphenylpyrrole-5-propionic acid (a) The reaction of the morpholino enamine of deoxybenzoin and methyl 5-bromo-4-oxo-valerate by the method of Example 1(b) gives methyl 4,7-dioxo-6,7-diphenylheptoate.

(b) Methyl 4,7-dioxo-6,7-diphenylheptoate is hydrolysed to the corresponding acid and is then heated with ammonium acetate as described in Example 1(a) to give the title pyrrole acid.

EXAMPLE 11

2,3-diphenylfuran-5-propionic acid (a) Methyl 4,7-dioxo-6,7-diphenylheptoate is heated at 100° C. with phosphorus pentoxide to give the methyl ester of the title acid.

(b) Hydrolysis of the ester of part (a) with sodium hydroxide gives the title furan acid.

EXAMPLE 12

2,3-diphenylthiophene-5-propionic acid (a) Methyl 4,7-dioxo-6,7-diphenylheptoate is heated at 100° C. with phosphorus pentasulphide to give the methyl ester of the title acid.

(b) Hydrolysis of the ester of part (a) with sodium hydroxide gives the title thiophene acid.

EXAMPLE 13

Ethyl 2,3-diphenylpyrrole-4-acetate (a) The morpholino enamine of deoxybenzoin is reacted with ethyl 3-bromo-4-oxobutyrate in a manner similar to that described in Example 1(b) to give ethyl 4,5-diphenyl-3-formyl-5-oxovalerate.

(b) Ethyl 4,5-diphenyl-3-formyl-5-oxovalerate (4.0 g.) is heated with ammonium acetate (20 g.) at 100° C. for 0.25 hour. Addition of water to the cooled melt and filtration of the solid gives the title pyrrole ester.

EXAMPLE 14

Ethyl 2,3-diphenylfuran-4-acetate

Ethyl 4,5-diphenyl-3-formyl-5-oxovalerate is heated with phosphorus pentoxide in benzene for 2 hours to give the title furan ester.

EXAMPLE 15

2,3-diphenylthiophene-4-acetic acid (a) Ethyl 4,5-diphenyl-3-formyl-5-oxovalerate is heated with phosphorus pentasulphide to give the ethyl ester of the title acid.

(b) Hydrolysis of the ester of part (a) with sodium hydroxide gives the title thiophene acid.

EXAMPLE 16

2,5-diphenylpyrrole-3-acetic acid

A mixture of 3,4-dibenzoylbutyric acid (4.0 g.), ammonium acetate (20.0 g.) and glacial acetic acid (20 ml.) is heated under reflux for 1 hour. Pouring the solution into water, extracting with ether and evaporating the organic extract gives a residue which is recrystallised from benzene/petroleum ether to give the title acid of M.P. 123–125° C.

EXAMPLE 17

2,5-di-(p-chlorophenyl)pyrrole-3-acetic acid (a) Diethyl α,β-di-(p-chlorobenzoyl)ethylmalonate is prepared by heating under reflux for 19 hours, a mixture of 1,2-di-(p-chlorobenzoyl)ethylene (96.3 g.), diethyl malonate (48.5 ml.), piperidine (6.0 ml.) and absolute ethyl alcohol (300 ml.). Evaporation under reduced pressure affords a red coloured oily residue which on dissolution in ether and treating with aqueous hydrochloric acid gives 104.7 g. (71%) of the diester of M.P. 111–112° C. after recrystallisation from ethyl alcohol.

Found (percent): C, 59.7; H, 4.6. $C_{23}H_{22}Cl_2O_6$ requires C, 59.4; H, 4.8.

(b) α,β-di-(p-chlorobenzoyl)ethylmalonic acid is prepared by heating under reflux for 2 hours, a mixture of the diester (50 g.) of Example 17(a) and 2 N aqueous sodium hydroxide solution (100 ml.). Evaporation of the solution gives a residue which is shaken with a mixture of ether and water. Acidification of the aqueous layer gives an oil which after extracting into ether, washing, drying and evaporating gives the di-acid (59.2 g.) as an oil which is used for the next stage without purification.

(c) 3,4-di-(p-chlorobenzoyl)butyric acid is prepared by refluxing for 2 hours, a solution of the di-acid (59.2 g.) of Example 17(b) in dimethylformamide (30 ml.) and then pouring into water (1.5 litre). An oil is precipitated which after extraction into ether, washing with water, drying ($MgSO_4$) and evaporating gives a brown coloured oil. This oil, which crystallises after a few hours, gives 33.1 g. (67.2%) of the butyric acid which has M.P. 96–97° C.

(d) The acid (10.0 g.) of Example 17(c) and ammonium acetate (20.0 g.) in glacial acetic acid (20 ml.) is heated under reflux for 1 hour. Pouring the solution into water (2 litres) gives a pink coloured solid, recrystallisation of which from benzene affords 7.08 g. (74.5%) of the title pyrrole of M.P. 163–166° C.

Found (percent): C, 62.4; H, 3.7; N, 3.8. $C_{18}H_{13}Cl_2NO$, requires C, 62.5; H, 3.8; N, 4.1.

EXAMPLE 18

2,5-di-(p-fluorophenyl)pyrrole-3-acetic acid (a) 1,2-di-(p-fluorobenzoyl)ethylene is prepared by adding dropwise fumaryl chloride (35.2 g., 25 ml.) to a mixture of fluorobenzene (250 ml.) and finely powdered aluminum chloride (80 g.) with stirring and warming to 60° C. The dark red solution is then heated at 70° C. for 0.5 hour followed by pouring into a mixture of ice and concentrated hydrochloric acid (20 ml.). The precipitated solid is extracted into methylene chloride followed by washing with dilute hydrochloric acid, water, drying ($MgSO_4$) and evaporating which gives an oily residue. Crystallisation from ethyl alcohol affords 44.2 g. (69.5%) of the substituted ethylene, which has M.P. 163–164° C. Found (percent): C, 70.7: H, 3.7. $C_{16}H_{10}F_2O_2$ requires C, 70.65; H, 3.7%.

(b) Diethyl α,β-di-(p-fluorobenzoyl)ethylmalonate is prepared by the method of Example 17(a) using 1,2-di-(p-fluorobenzoyl)ethylene (42.3 g.), diethyl malonate (24.6 ml.), piperidine (3.0 ml.) and absolute ethyl alcohol (150 ml.). The crude oil (50.0 g.) is used for the next stage without purification.

(c) α,β-di-(p-fluorobenzoyl)ethylmalonic acid is prepared by the method of Example 17(b) using 50.0 g. of crude diester of Example 18(b) and 2 N aqueous sodium hydroxide (100 ml.). The oily product (39.0 g.) is used for the next stage without purification.

(d) 3,4-di-(p-fluorobenzoyl)butyric acid is prepared by the method of Example 17(c) using the di-acid (39.0 g.) of Example 18(c) and dimethylformamide (30 ml.). This oil is again used for the next stage without purification.

(e) The title pyrrole is prepared by the method of Example 17(d) using the butyric acid (16.6 g.) of Example 18(d), ammonium acetate (14.0 g.) and glacial acetic acid (30 ml.). The product (2.7 g.) after recrystallisation from a mixture of benzene and petroleum ether has M.P. 143–144° C.

Found (percent): C, 68.6; H, 3.9; N, 4.3. $C_{18}H_{13}F_2NO_2$ requires C, 69.0; H, 4.2; N, 4.5.

EXAMPLE 19

2,5-di-(p-methoxyphenyl)pyrrole-3-acetic acid

A mixture of 3,4-di-(p-methoxybenzoyl) butyric acid (4.2 g.), glacial acetic acid (10 ml.) and ammonium acetate (4.5 g.) is heated under reflux for 1 hour and then worked up as described in Example 17(d) to give the title compound.

Found (percent): C, 71.3; H, 5.65; N, 4.05. $C_{20}H_{19}NO_4$ requires C, 71.3; H, 5.7; N, 4.2.

EXAMPLE 20

2,5-di-(p-tolyl)pyrrole-3-acetic acid

A mixture of 3,4-di-(p-methylbenzoyl)butyric acid (33.3 g.), glacial acetic acid (60 ml.) and ammonium acetate (34.05 g.) is heated under reflux for 1 hour and then worked up as described in Example 17(d) to give the title acid.

EXAMPLE 21

2,5-diphenylfuran-3-acetic acid (a) A mixture of 10.0 g. of diethyl $\alpha,\beta$-dibenzoylethylmalonate [prepared by the method of Example 17(a)], phosphoric oxide (50.0 g.) and dry benzene (250 ml.) is heated under reflux for 1 hour. The solvent is then decanted from the solid material after which the solid is treated with water and benzene. Separating the benzene layer, washing with water, drying ($MgSO_4$) and evaporating affords the furan-diester (5.35 g.) as an oil which is used for the next stage.

(b) The above furan-diester (5.35 g.) and 2 N aqueous sodium hydroxide solution (50 ml.) is heated on a steam-bath for 0.5 hour and the ethanol produced is evaporated. The aqueous solution is washed with ether and after treating with charcoal it is acidified with concentrated hydrochloric acid. Filtering off the solid, drying and recrystallising from benzene gives 2.75 g. of the furan diacid of M.P. 143–144° C.

Found (percent): C, 70.1; H, 4.3. $C_{19}H_{14}O_5$ requires C, 70.8; H, 4.4.

(c) Heating under reflux for 1 hour a solution of the above di-acid (2.55 g.) in dimethylformamide (10 ml.) and then pouring into water (500 ml.) gives a precipitate which is extracted into ether and after washing several times with water is extracted with saturated aqueous sodium hydrogen carbonate solution. The basic extract is decolourised with charcoal and after filtering is acidified to give a colourless precipitate which is filtered off and dried. Recrystallisation from a mixture of benzene and petroleum ether (B.P. 40–60° C.) affords 0.77 g. of the title furan acetic acid of M.P. 134–135° C.

Found (percent): C, 77.2; H, 5.0. $C_{18}H_{14}O_3$ requires C, 77.4; H, 5.1.

EXAMPLE 22

2,5-di-(p-chlorophenyl)furan-3-acetic acid

This compound is prepared by the procedure of Example 21, starting from 30.0 g. of the diester of Example 17(a). Recrystallisation of the crude acid from benzene affords 16.3 g. of the title compound of M.P. 153–154° C.

Found (percent): C, 62.6; H, 3.6. $C_{18}H_{12}Cl_2O_3$ requires C, 62.3; H, 3.5.

EXAMPLE 23

2,5-di-(p-fluorophenyl)furan-3-acetic acid

A solution of 6.8 g. of the crude acid of Example 18(d) in glacial acetic acid (30 ml.) containing a few drops of concentrated sulphuric acid is heated under reflux for 1 hour and then cooled. Addition of water gives a solid which is filtered off, washed with water and dried. Recrystallisation from benzene affords 4.48 g. of the title acid of M.P. 160–161° C.

Found (percent): C, 69.0; H, 3.85. $C_{18}H_{12}F_2O_3$ requires C, 68.85; H, 3.85.

EXAMPLE 24

2,5-di-(p-methoxyphenyl)furan-3-acetic acid

A mixture of 3,4-di-(p-methoxybenzoyl)butyric acid (4.0 g.), glacial acetic acid (10 ml.) and concentrated sulphuric acid (1 drop) is heated under reflux for 1 hour and then worked up as described in Example 23. Recrystallisation from benzene gives the title acid.

Found (percent): C, 77.4; H, 5.5. $C_{20}H_{18}O_5$ requires C, 71.1; H, 5.4.

EXAMPLE 25

2,5-di-(p-tolyl)furan-3-acetic acid

A mixture of 3,4-di-(p-methylbenzoyl)butyric acid (15.55 g.) glacial acetic acid (60 ml.) and concentrated sulphuric acid (5 drops) is heated under reflux for 1 hour and then worked up as described in Example 23. Recrystallisation from a mixture of benzene and petroleum ether gives 2.67 g. of the title acid of M.P. 142–143° C.

Found (percent): C, 78.4; H, 5.9. $C_{20}H_{18}O_3$ requires C, 78.4; H, 5.9.

EXAMPLE 26

2-(p-chlorophenyl)-5-phenylfuran-3-acetic acid (a) Sodium (2.3 g.) is added to a stirred solution of ethyl p-chlorobenzoylacetate (22.7 g.) in ether (300 ml.), in an atmosphere of nitrogen. After heating under reflux for 6 hours the mixture is cooled and treated with phenacylbromide (20.0 g.) followed by further heating under reflux for 1.5 hours. The mixture is again cooled and treated with water. Separating the organic layer, drying ($MgSO_4$) and evaporating gives 40.0 g. of ethyl 2 - (p-chlorobenzoyl - 3 - benzoylpropionate as a red oil.

(b) Refluxing a mixture of 5.0 g. of the ester of part (a) and glacial acetic acid (40 ml.) and concentrated sulphuric acid (2 drops) for 1 hour and working up as described in Example 23 gives 2 - (p-chlorophenyl)-3-ethoxycarbonyl-5-phenylfuran.

(c) The ethoxycarbonyl compound of part (b) is reduced in ether with aluminium lithium hydride to give the corresponding hydroxymethyl compound. Subsequent chlorination, treatment with an alkali metal cyanide and hydrolysis affords the title compound.

EXAMPLE 27

5-(p-chlorophenyl)-2-phenylfuran-3-acetic acid (a) The method of Example 27(a) using ethyl benzoylacetate and p-chlorophenacylbromide gives ethyl 3-(p-chlorobenzoyl)-2-benzoylpropionate.

(b) Refluxing a mixture of 2.0 g. of the ester of part (a) and glacial acetic acid (20 ml.) and concentrated sulphuric acid (2 drops) for 1 hour and working up as described in Example 23 gives 1.5 g. of 5 - (p-chlorophenyl)-3-ethoxycarbonyl - 2 - phenyl-furan of M.P. 73–74° C. after recrystallising from ethanol.

Found (percent): C, 69.9; H, 4.6. $C_{19}H_{15}ClO_3$ requires C, 69.8; H, 4.6.

(c) The ethoxycarbonyl compound of part (b) is reduced in ether with aluminium lithium hydride to give the corresponding hydroxymethyl compound. Subsequent chlorination, treatment with an alkali metal cyanide and hydrolysis affords the title compound.

EXAMPLE 28

2,5-diphenylthiophene-3-acetic acid

A solution of diethyl $\alpha,\beta$-dibenzoylethylmalonate (7.84 g.) and anhydrous stannic chloride (12.0 g.) in chloroform (500 ml.) is treated with dry hydrogen chloride for 1 minute and then hydrogen chloride and hydrogen sulphide are introduced simultaneously for 2 hours. After the mixture has stood for 16 hours at room temperature it is washed with water, sodium hydrogen carbonate solution, water and is then dried. Evaporating to dryness then gives diethyl 2,5-diphenylthiophene-3-malonate. Hydrolysis of this ester under basic conditions and then decarboxylation in dimethylformamide gives the title acid.

EXAMPLE 29

Ethyl 3,5-diphenylpyrrole-2-acetate (a) The morpholino enamine of acetophenone [i.e. 1-(4'-morpholino)styrene] is treated with ethyl 4-bromo-4-phenylacetoacetate in a manner similar to that described in Example 1(b) to give ethyl 3,6-dioxo - 4,6 - diphenylhexanoate.

(b) Heating ethyl 3,6 - dioxo - 4,6 - diphenylhexanoate with ammonium acetate in glacial acetic acid according to the method of Example 17(d) gives the title pyrrole ester.

EXAMPLE 30

3,5-diphenylpyrrole-2-acetic acid

The pyrrole ester (5.0 g.) of Example 29(b) in ethanol (50 ml.) is treated with a solution of potassium hydroxide (3.0 g.) in water (10 ml.) and is then warmed to 50° C. for 0.5 hour. The excess of alcohol is removed under reduced pressure and the residue is dissolved in water (50 ml.). Acidification with hydrochloric acid precipitates the title acid which is filtered off and dried.

EXAMPLE 31

Ethyl 3,5-diphenylfuran-2-acetate

Heating ethyl 3,6 - dioxo - 4,6 - diphenylhexanoate [prepared by method of Example 29(a)] with glacial acetic acid and concentrated sulphuric acid according to the method of Example 23 gives the title furan ester.

EXAMPLE 32

3,5-diphenylfuran-2-acetic acid

The furan ester of Example 31 is hydrolysed with potassium hydroxide as described in Example 30 to give the title acid.

EXAMPLE 33

Ethyl 3,5-diphenylthiophene-2-acetate

Cyclising ethyl 3,6 - dioxo - 4,6 - diphenylhexanoate [prepared by method of Example 29(a)] in chloroform solution with hydrogen chloride and hydrogen sulphide according to the method of Example 28 gives the title thiophene ester.

EXAMPLE 34

3,5-diphenylthiophene-2-acetic acid

Hydrolysis of the ester of Example 33 with potassium hydroxide by the method of Example 30 gives the title thiophene acid.

EXAMPLE 35

3,4-diphenylpyrrole-2-propionic acid (a) The pyrrolidino enamine of phenylacetaldehyde [i.e. 2-(1'-pyrrolidino)styrene] is reacted with ethyl 5-bromo-4-oxo-5-phenylvalerate in a similar manner to that described in Example 1(b) to give ethyl 4,7-dioxo-5,6-diphenylheptoate.

(b) Ethyl 4,7-dioxo - 5,6 - diphenylheptoate is hydrolysed to the corresponding acid and then treated with ammonium acetate in glacial acetic acid by the method described in Example 17(d) to give the title pyrrole acid.

EXAMPLE 36

Ethyl 3,4-diphenylfuran-2-propionate

Heating ethyl 4,7 - dioxo - 5,6 - diphenylheptoate [prepared by method of Example 35(a)] with glacial acetic acid and concentrated sulphuric acid by the method of Example 23 gives the title furan ester.

EXAMPLE 37

3,4-diphenylfuran-2-propionic acid

The furan ester of Example 36 is hydrolysed with potassium hydroxide as described in Example 30 to give the title acid.

EXAMPLE 38

Ethyl 3,4-diphenylthiophene-2-propionate

Cyclising ethyl 4,7-dioxo-5,6-diphenylheptoate [prepared by method of Example 35(a)] in chloroform solution with hydrogen chloride and hydrogen sulphide according to the method of Example 28 gives the title thiophene ester.

EXAMPLE 39

3,4-diphenylthiophene-2-propionic acid

Hydrolysis of the ester of Example 38 with potassium hydroxide by the method of Example 30 gives the title thiophene acid.

EXAMPLE 40

2,4-diphenylpyrrole-3-acetic acid (a) The pyrrolidino enamine of phenylacetaldehyde [i.e. 2-(1'-pyrrolidino)-styrene] is reacted with β-benzoyl-β-bromopropionic acid in a similar manner to that described in Example 1(b) to give 3-benzoyl-5-oxo-4-phenylvaleric acid.

(b) Heating 3-benzoyl-5-oxo-4-phenylvaleric acid in glacial acetic acid with ammonium acetate by the method described in Example 17(d) gives the title pyrrole acid.

EXAMPLE 41

2,4-diphenylfuran-3-acetic acid

Heating 3-benzoyl-5-oxo-4-phenylvaleric acid with glacial acetic acid and concentrated sulphuric acid by the method of Example 23 gives the title furan acid.

EXAMPLE 42

Ethyl 2,4-diphenylthiophene-3-acetate (a) Ethyl 3-benzoyl-5-oxo-4-phenylvalerate is prepared by the method of Example 1(b) using ethyl β-benzoyl-β-bromopropionate and the pyrrolidino enamine of phenylacetaldehyde [i.e. 2-(1'-pyrrolidino)styrene].

(b) Cyclisation of ethyl 3-benzoyl-5-oxo-4-phenylvalerate in chloroform solution with hydrogen chloride and hydrogen sulphide according to the method of Example 28 gives the title thiophene ester.

EXAMPLE 43

2,4-diphenylthiophene-3-acetic acid

Hydrolysis of the ester of Example 42 with potassium hydroxide by the method of Example 30 gives the title thiophene acid.

EXAMPLE 44

2,3-diphenylpyrrole-4-acetic acid

Hydrolysis of the ester of Example 13(b) with potassium hydroxide by the method described in Example 30 gives the title pyrrole acid.

EXAMPLE 45

Ethyl 2,3-diphenylfuran-4-acetate

Heating ethyl 4,5-diphenyl-3-formyl - 5 - oxo - valerate [prepared by the method of Example 13(a)] with concentrated sulphuric acid in glacial acetic acid by the method of Example 23 gives the title furan ester.

EXAMPLE 46

2,3-diphenylfuran-4-acetic acid

Hydrolysis of the ester of Example 45 with potassium hydroxide by the method of Example 30 gives the title furan acid.

EXAMPLE 47

Ethyl 2,3-diphenylthiophene-4-acetate

Cyclising ethyl 4,5-diphenyl - 3 - formyl-5-oxovalerate [prepared by the method of Example 13(a)] in chloroform solution with a mixture of hydrogen chloride and

15 hydrogen sulphide according to the method of Example 28 gives the title thiophene ester

EXAMPLE 48

2,3-diphenylthiophene-4-acetic acid

Hydrolysis of the ester of Example 47 with potassium hydroxide according to the method of Example 30 gives the title thiophene acid.

EXAMPLE 49

2,3-diphenylpyrrole-5-propionic acid (a) The reaction of the morpholino enamine of deoxybenzoin and methyl 5-bromo-4-oxo-valerate by the method of Example 1(b) gives methyl 4,7-dioxo-6,7-diphenylheptoate.

(b) Methyl 4,7-dioxo-6,7-diphenylheptoate is hydrolysed to the corresponding acid and then heated with ammonium acetate in glacial acetic acid to give the title pyrrole acid.

EXAMPLE 50

Methyl 2,3-diphenylfuran-5-propionate

Methyl 4,7-dioxo-6,7-diphenylheptoate is cyclised in a mixture of glacial acetic acid and concentrated sulphuric acid by the method of Example 23 to give the title furan ester.

EXAMPLE 51

2,3-diphenylfuran-5-propionic acid

Hydrolysis of the ester of Example 50 using potassium hydroxide by the procedure of Example 30 gives the title furan acid.

EXAMPLE 52

Methyl 2,3-diphenylthiophene-5-propionate

Cyclising methyl 4,7 - dioxo-6,7-diphenylheptoate in chloroform solution with a mixture of hydrogen chloride and hydrogen sulphide according to the method of Example 28 gives the title thiophene ester.

EXAMPLE 53

2,3-diphenylthiophene-5-propionic acid

Hydrolysis of the ester of Example 52 using potassium hydroxide by the procedure described in Example 30 gives the title thiophene acid.

EXAMPLE 54

5-(p-aminophenyl)-2-phenylpyrrole-3-acetic acid

The corresponding p-nitro compound of Example 1 is reduced with hydrogen in the presence of palladium on charcoal catalyst to give the title pyrrole acid.

EXAMPLE 55

α[2,5-di-(p-chlorophenyl)pyrrol-3-yl]-α-methylacetic acid

The title compound is prepared in a similar manner to that described in Example 17 except that diethyl methylmalonate is used for the Michael reaction instead of diethyl malonate.

EXAMPLE 56

2,5-di-(p-chlorophenyl)furan-3-acetamide

The furan acetic acid of Example 22 is converted into the acid chloride by treatment with thionyl chloride. Subsequent treatment with ammonia gives the title amide.

EXAMPLE 57

2,5-di-(p-chlorophenyl)furan-3-acethydroxamic acid

The furan acetic acid of Example 22 is esterified with hydrogen chloride in ethyl alcohol and the ester subsequently treated with hydroxylamine to give the title hydroxamic acid.

16

EXAMPLE 58

2,5-diphenyl-4-methylpyrrole-3-acetic acid (a) 1,2-dibenzoyl-1,-methylethylene is prepared by adding dropwise mesaconyl dichloride to a mixture of benzene and finely powdered aluminium chloride with stirring and warming to 60° C. The solution is then heated at 70° C. for 0.5 hour followed by pouring into a mixture of ice and concentrated hydrochloric acid. The mixture is extracted with methylene chloride and the extract is washed with dilute hydrochloric acid and water. Drying over magnesium sulphate and evaporating gives the substituted ethylene.

(b) Diethyl α,β-dibenzoylpropylmalonate is prepared by the method of Example 17(a) using 1,2-dibenzoyl-1-methylethylene, diethyl malonate, piperidine and ethyl alcohol.

(c) α,β-dibenzoylpropylmalonic acid is prepared by the method of Example 17(b) using the diester of part (b) and aqueous sodium hydroxide.

(d) 3,4-dibenzoylvaleric acid is prepared by the method of Example 17(c) using the di-acid of part (c) and dimethylformamide.

(e) The title pyrrole acid is prepared by the method of Example 17(d) using the valeric acid of part (d), ammonium acetate and glacial acetic acid.

EXAMPLE 59

2,5-di-(p-chlorophenyl)-N-phenylpyrrole-3-acetic acid

A mixture of 5.56 g. of the diketo-acid of Example 17(c), aniline (1.86 g.) and p-toluenesulphonic acid (50 mg.) in toluene (50 ml.) is heated under reflux for 1 hour using a Dean and Stark water separator. The mixture is then cooled and the solid filtered off and dried to give 4.0 g. of the title pyrrole acid.

Found (percent): C, 68.1; H, 4.1; N, 3.4. $C_{24}H_{17}Cl_2NO_2$ requires C, 68.2; H, 4.3; N, 3.3.

In a similar manner the following amines give the products indicated:

| Amine | Product |
| --- | --- |
| p-Chloroaniline | 1,2,5-tri-(p-chlorophenyl)-pyrrole-3-acetic acid. |
| m-Trifluoromethylaniline | 2,5-di-(p-chlorophenyl)-N-(m-trifluoromethylphenyl)pyrrole-3-acetic acid. |
| p-Methoxyaniline | 2,5-di-(p-chlorophenyl)-N-(p-methoxyphenyl)pyrrole-3-acetic acid. |
| p-Toluidine | 2,5-di-(p-chlorophenyl)-N-(p-tolyl) pyrrole-3-acetic acid. |
| p-Nitroaniline | 2,5-di-(p-chlorophenyl)-N-(p-nitrophenyl) pyrrole-3-acetic acid. |
| p-Dimethylaminoaniline | 2,5-di-(p-chlorophenyl)-N-(p-dimethylaminophenyl)pyrrole-3-acetic acid. |
| 4-aminopyridine | 2,5-di-(p-chlorophenyl)-N-(pyrid-4-yl)-pyrrole-3-acetic acid. |
| Benzylamine | N-benzyl-2,5-di-(p-chlorophenyl)pyrrole-3-acetic acid. |
| Cyclohexylamine | N-cyclohexyl-2,5-di-(p-chlorophenyl)-pyrrole-3-acetic acid. |

EXAMPLE 60

2,5-di-(p-chlorophenyl)-1-methylpyrrole-3-acetic acid

A mixture of 3,4 - di-(p-chlorobenzoyl)butyric acid (5.0 g.), methylammonium chloride (2.5 g.), sodium acetate (2.5 g.) and glacial acetic acid (25 ml.) is heated under reflux for 1.5 hours and the sodium chloride is filtered off after cooling the mixture. The filtrate is poured into water (200 ml.) which after filtering off the solid, drying and recrystallising from benzene gives 2.0 g. of the title compound.

Found (percent): C, 63.6; H, 4.15; N, 3.9.

$$C_{19}H_{15}Cl_2NO_2$$

requires C, 63.35; H, 4.2; N, 3.9).

EXAMPLE 61

N-(p-chlorobenzoyl)-2,5-di-(p-fluorophenyl) pyrrole-3-acetic acid (a) A solution of 2,5 - di-(p-fluorophenyl)pyrrole-3-acetic acid in tetrahydrofuran is treated with cyclohexylcarbodiimide to give the corresponding anhydride. Reacting this anhydride with ter-butyl alcohol in the presence of zinc chloride gives tert-butyl 2,5-di-(p-fluorophenyl)-pyrrole-3-acetate.

(b) The tert-butyl ester of part (a) is converted into its alkali metal derivative and subsequently treated with p-chlorobenzoyl chloride to give tert-butyl N-(p-chlorobenzoxyl) - 2,5 - di-(p-fluorophenyl)-pyrrole-3-acetate.

(c) The ester of part (b) is heated to 200° C. with powdered porous plate to give the title acid.

In a similar manner, the following acid halides give the products indicated:

| Acid halide | Product |
| --- | --- |
| Acetyl chloride | N-acetyl-2,5-di-(p-fluorophenyl)pyrrole-3-acetic acid. |
| Cyclohexylcarbonyl chloride | N-cyclohexylcarbonyl-2,5-di-(p-fluorophenyl)pyrrole-3-acetic acid. |
| Phenylacetyl chloride | N-phenylacetyl-2,5-di-(p-fluorophenyl)pyrrole-3-acetic acid. |
| Benzoyl chloride | N-benzoyl-2,5-di-(p-fluorophenyl)pyrrole-3-acetic acid. |
| p-Methylbenzoyl chloride | N-(p-methylbenzoyl)-2,5-di-(p-fluorophenyl)pyrrole-3-acetic acid. |
| p-Methoxybenzoyl chloride | N-(p-methoxybenzoyl)-2,5-di-(p-fluorophenyl)pyrrole-3-acetic acid. |
| p-Nitrobenzoyl chloride | N-(p-nitrobenzoyl)-2,5-di(p-fluorophenyl)pyrrole-3-acetic acid. |
| p-Dimethylaminobenzoyl chloride | N-(p-dimethylaminobenzoyl)-2,5-di-(p-fluorophenyl)pyrrole-3-acetic acid. |
| m-Trifluoromethylbenzoyl chloride | N-(m-trifluoromethylbenzoyl)-2,5-di-(p-fluorophenyl)pyrrole-3-acetic acid. |
| 1-naphthoyl chloride | N-(1'-naphthoyl)-2,5-di-(p-fluorophenyl)pyrrole-3-acetic acid. |
| 2-furoyl chloride | N-(2'-furoyl)-2,5-di-(p-fluorophenyl)pyrrole-3-acetic acid. |
| 2-thenoyl chloride | N-(2'-thenoyl)-2,5-di-(p-fluorophenyl)pyrrole-3-acetic acid. |
| 4-pyridylcarbonyl chloride | N-(4'-pyridylcarbonyl)-2,5-di-(p-fluorophenyl)pyrrole-3-acetic acid. |
| 2-pyrrylcarbonyl chloride | N-(2'-pyrrylcarbonyl)-2,5-di-(p-fluorophenyl)pyrrole-3-acetic acid. |

EXAMPLE 62

N-(p-aminobenzoyl)-2,5-di-(p-fluorophenyl)pyrrole-3-acetic acid

The p-nitro compound of Example 61 is reduced with hydrogen in the presence of palladium on charcoal catalyst to give the title pyrrole acid.

In the pharmacological evaluation of the properties of the compounds of this invention, the effects in vivo of the compounds are tested in the procedure of Winter et al. in Proc. Soc. Biol. Med., 111, 544 (1962) and Buttle et al. in Nature, 179, 629 (1957).

The compounds of general Formula I when administered orally in the above test procedure at a dosage of 10 to 250 mg./kg. depending on the compound in question, demonstrated anti-inflammatory activity.

Good activity was obtained with 2,5 - di-(p-fluorophenyl)pyrrole - 3 - acetic acid, 2,5 - di-(p-methoxyphenyl)furan - 3 - acetic acid, 2,5 - diphenylpyrrole-3-acetic acid, 2,5-diphenylfuran-3-acetic acid, 2,5 - di-(p-chlorophenyl)pyrrole-3-acetic acid and 2,5 - di-(p-chlorophenyl)furan - 3 - acetic acid as shown in the following table which shows the percent inhibition of the rat paw oedema and dosage tested.

| Compound | Dose, mg./kg. | Percent inhibition |
| --- | --- | --- |
| 2,5-di-(p-fluorophenyl)pyrrole-3-acetic acid | 10 | 70 |
| 2,5-di-(p-methoxyphenyl)furan-3-acetic acid | 50 | 35 |
| 2,5-diphenylpyrrole-3-acetic acid | 20 | 53 |
| 2,5-diphenylfuran-3-acetic acid | 20 | 40 |
| 2,5-di-(p-chlorophenyl)pyrrole-3-acetic acid | 30 | 43 |
| 2,5-di-(p-chlorophenyl)furan-3-acetic acid | 20 | 35 |

EXAMPLE 63

|  | Mg. |
| --- | --- |
| 2,5-di-(p-fluorophenyl)pyrrole-3-acetic acid | 125 |
| Lactose | 120 |
| Magnesium stearate | 5 |

Capsules of the above were made up by thoroughly mixing together batches of the above ingredients and filling hard gelatine capsules (250 mg.) with the mixture.

EXAMPLE 64

|  | Mg. |
| --- | --- |
| 2,5-diphenylpyrrole-3-acetic acid | 125 |
| Lactose | 100 |
| Avicel | 30 |
| Dried maize starch | 40 |
| Magnesium stearate | 5 |

Tablets of the above composition were made by milling the active ingredient to 40 mesh (British Standard), sieving through a 40 mesh (British Standard) sieve, mixing the milled material with the other components and compressing to form tablets.

What is claimed is:
1. A compound having the formula:

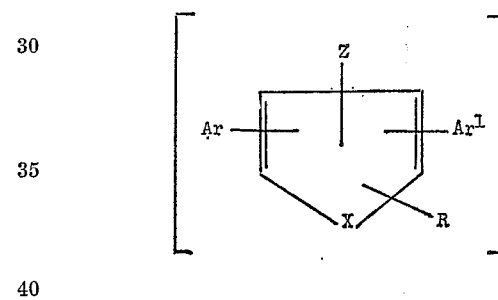

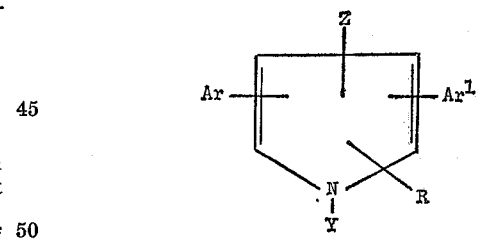

in which Ar and Ar$^1$ are each radicals of the group consisting of phenyl, halophenyl, loweralkylphenyl, loweralkoxyphenyl, nitrophenyl, aminophenyl, diloweralkylaminophenyl, trifluoromethylphenyl, 1- and 2- naphthyl, 2- and 3- furyl, 2- and 3- thienyl and 2-, 3- and 4- pyridyl; R is a member of the group consisting of radicals having the formula

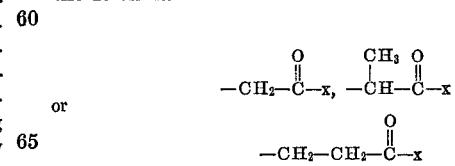

in which X is a member of the group consisting of —OH, —NH$_2$, NHOH, and lower alkoxy; Y is a member of the group consisting of hydrogen, lower alkyl, cyclaloweralkyl, phenyl lower alkyl, phenyl, halophenyl, loweralkylphenyl, loweralkoxyphenyl, nitrophenyl, diloweralkylaminophenyl, and trifluoromethylphenyl; and Z is a member of the group consisting of hydrogen and lower alkyl.

2. A compound having the formula

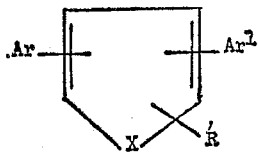

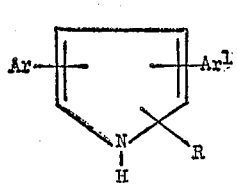

in which Ar and Ar¹ are each radicals selected from the group consisting of phenyl, halophenyl, loweralkylphenyl, loweralkoxyphenyl and trifluoromethylphenyl; and R is a member of the group consisting of $$-CH_2-CO_2H, -CH_2-CH_2-CO_2H$$

and their lower alkyl esters.

3. A compound according to claim 2 which is 2,5-diphenylpyrrole-3-acetic acid.

4. A compound according to claim 2 which is 2,5-di-(p-fluorophenyl)pyrrole-3-acetic acid.

5. A compound according to claim 2 which is 2,5-di-(p-methoxyphenyl)pyrrole-3-acetic acid.

6. A compound according to claim 2 which is 2,5-di-(p-tolyl)pyrrole-3-acetic acid.

7. A compound according to claim 2 which is 2,5-di-(p-chlorophenyl)pyrrole-3-acetic acid.

References Cited
UNITED STATES PATENTS
3,487,089   12/1969   Umio et al. _____ 260—313.1

ALEX MAZEL, Primary Examiner
J. A. NARCAVAGE, Assistant Examiner

U.S. Cl. X.R.
260—295 R, 295.5 R, 332.2 A, 347.3, 347.4, 469; 424—274, 275, 285